No. 814,922. PATENTED MAR. 13, 1906.
H. SCHÜLER.
DOUBLE BOGIE FOR RAILWAY CARS AND OTHER VEHICLES.
APPLICATION FILED SEPT. 26, 1904. RENEWED NOV. 9, 1905.

WITNESSES: INVENTOR:
Hans Schüler,
By H. H. de Vas.
Attorney.

UNITED STATES PATENT OFFICE.

HANS SCHÜLER, OF HAMBURG, GERMANY.

DOUBLE BOGIE FOR RAILWAY-CARS AND OTHER VEHICLES.

No. 814,922.    Specification of Letters Patent.    Patented March 13, 1906.

Application filed September 26, 1904. Renewed November 9, 1905. Serial No. 286,497.

*To all whom it may concern:*

Be it known that I, HANS SCHÜLER, a subject of the German Emperor, residing at No. 6 Hansaplatz, in the city of Hamburg, Germany, have invented a certain new and useful Improvement in Double Bogies for Railway-Cars and other Vehicles, of which the following is a specification, such as will enable others skilled in the art to which it appertains to make and use the same.

The object of my invention is to provide a double bogie or eight-wheel truck for railway and other vehicles which while having great resiliency and strength will be more compact and shorter longitudinally than are the ordinary double-bogie eight-wheel trucks now in use, and this I accomplish by so forming and securing together the single bogies, each of which carries four wheels, in such manner that the rear wheels of one single-bogie truck and the forward wheels of the other bogie-truck are located between the front and rear wheels of the mating truck.

Said invention is fully shown and described in the following specification, of which the accompanying drawings form a part, wherein similar letters of reference designate like or equivalent parts wherever found throughout the several views, and in which—

Figure 1:
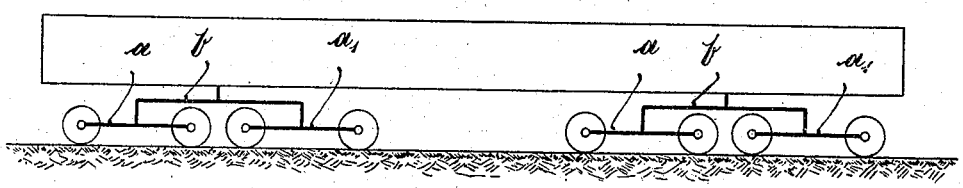
Figure 2:
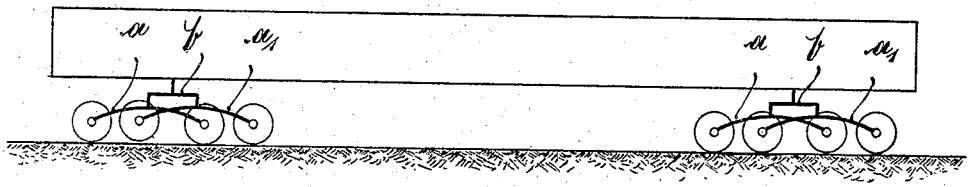
Figure 3:
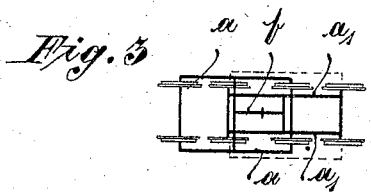
Figure 4:
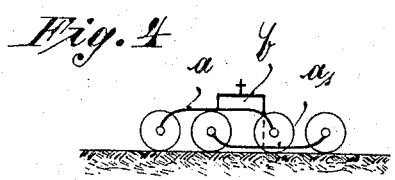

Figure 1 is a side diagrammatic view of a car of the ordinary well-known double-bogie truck form now in general use. Fig. 2 is a like view of a car provided with my improved double-bogie truck. Fig. 3 is a top plan view of a double-bogie truck of my improved form removed from the car. Fig. 4 is a side view of a slightly-modified form of construction from that shown in Fig. 3; and Fig. 5 is an end view of the construction shown in Fig. 3, while Fig. 6 is a like end view of the construction shown in Fig. 4.

In the drawings the reference-letters $a$ represent one single-bogie truck-frame, and $a'$ its mating bogie truck-frame, while the reference-letter $b$ designates the double-bogie truck-frame joining the single-bogie trucks together into a double-bogie truck.

As will be seen, the improvement consists in arranging the frames of the single bogies partly beside or over each other in such a manner that that axle of each single bogie which is nearer to the main vertical axis of the double bogie is situated between the axles of the other single bogie, as shown in Fig. 2, in contradistinction to Fig. 1, in which the separate bogies are arranged one behind the other. In Fig. 2 the frames of the separate bogie are represented by curved lines, because straight lines would partly overlap and render the drawing unintelligible. The arrangement shown in Fig. 2 enables the distance between the axles of the separate bogies to be increased in order to minimize the racking movement and the length of the entire double-bogie frame to be decreased to a considerable extent. Compared with the construction shown in Fig. 1 the reduction of the length of the double-bogie frame according to Fig. 2 has the advantage that the connection between the vertical axles of the separate bogie-frames is shorter and lighter and the distance the car overhangs at each end is reduced. As a consequence vibrations at the car ends are reduced and the limitations of the dimensions heretofore necessary in view of the curves to be passed over is also rendered less.

Figure 5:
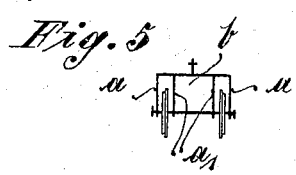
Figure 6:

The frames of the separate bogies $a$ $a'$ can be arranged either behind each other, as shown in Fig. 3 in plan and in Fig. 5, or over each other, as represented in Fig. 4 in side view and in Fig. 6. As indicated in dotted lines in Fig. 3, the frame can be arranged either inside or outside the wheels. Further modifications of the frame can be made by bending the metal.

While my invention is designed and intended more particularly for railway-vehicles, the same is not by any means limited thereto and may with advantage be used in road-vehicles of various kinds, such as automobiles, &c.

Having now particularly described and ascertained the nature of my said invention and in what manner the same is to be performed, I declare that what I claim is—

1. A double bogie for railway-cars and other vehicles in which that axle of the single bogie which is nearest to the main vertical axle of the double-bogie frame is located between the axles of the other single bogie, substantially as shown and described.

2. In a double bogie for railway-cars, a single-bogie frame located within the wheels at the four corners of such frame, a like single-bogie mating frame exterior to the wheels at the four corners thereof, and a double-bogie frame securing the two single-bogie frames together, in such manner that those wheels and axles of each frame nearest to the center of the double-bogie frame are located between the front and rear wheels and axles of the other bogie-frames, substantially as shown and described.

In testimony that I claim the foregoing as my invention I have signed my name in presence of two subscribing witnesses.

HANS SCHÜLER.

Witnesses:
E. H. L. MUMMENHOFF,
OTTO W. HELLMRICH.